(12) United States Patent
Funaki et al.

(10) Patent No.: US 7,801,433 B2
(45) Date of Patent: Sep. 21, 2010

(54) CAMERA WITH AF AUXILIARY ILLUMINATION

(75) Inventors: Akihiko Funaki, Asaka (JP); Yoichi Iwasaki, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 617 days.

(21) Appl. No.: 11/767,291

(22) Filed: Jun. 22, 2007

(65) Prior Publication Data

US 2008/0037976 A1 Feb. 14, 2008

(30) Foreign Application Priority Data

Aug. 11, 2006 (JP) ............................. 2006-220295

(51) Int. Cl.
*G03B 15/02* (2006.01)
(52) U.S. Cl. ..................... 396/108; 348/371
(58) Field of Classification Search ................ 396/106, 396/108; 348/353, 370, 371; 362/3–5, 8
See application file for complete search history.

(56) References Cited

U.S. PATENT DOCUMENTS 5,293,194 A * 3/1994 Akashi ....................... 396/104
6,240,252 B1 * 5/2001 Yamaguchi et al. ......... 396/106
6,263,164 B1 * 7/2001 Nakahara et al. ............ 396/104
2004/0095505 A1 5/2004 Gotanda

FOREIGN PATENT DOCUMENTS

JP 2004-157417 A 6/2004

* cited by examiner

*Primary Examiner*—Melissa J Koval
*Assistant Examiner*—Autumn Parker
(74) *Attorney, Agent, or Firm*—Sughrue Mion, PLLC

(57) ABSTRACT

The present invention provides a camera with AF auxiliary illumination in which the focus position of an image taking lens is AF controlled to bring an object into focus, based on contrast information of an image acquired from an image pickup device, and if the photometric value of the object is less than a predetermined value, an AF auxiliary illumination is directed to the object, wherein the AF auxiliary illumination reflected from the object is measured, in which if the photometric value is greater than or equal to a specified value, the AF auxiliary illumination is dimmed out, and the emission amount of the AF auxiliary illumination is controlled based on the focus position of the image taking lens.

18 Claims, 12 Drawing Sheets

CAMERA WITH AF AUXILIARY ILLUMINATION

BACKGROUND OF THE INVENTION

1. Field of the Invention

The present invention relates to a camera with AF auxiliary illumination, and particularly to a camera with AF (Auto Focus: automatic focusing) auxiliary illumination which directs an AF auxiliary illumination to the object if the photometric value of the object is less than a predetermined value.

2. Description of the Related Art

In a digital camera which converts an optical image of the object into an electrical signal using a solid-state image pickup element such as a CCD, CMOS and so on, and records it on the recording medium, it is common that an image taking lens is AF controlled (contrast AF) based on contrast information of an image acquired from the solid-state image pickup element.

By the way, with such AF control, if the object is photographed in the dark environment such as at night, it is difficult to detect the focus position because of low contrast of the object.

Thus, in Japanese Patent Application Laid-Open No. 2004-157417, an AF auxiliary illumination is directed to the object, its reflected light is measured by the solid-state image pickup element, and the aperture value and shutter speed for the AF control are set, based on this photometric value, in photographing in the dark environment. Thereby, the focused state can be detected correctly, because the contrast information can be acquired based on the image obtained by reasonable exposure.

SUMMARY OF THE INVENTION

However, in a digital camera of Japanese Patent Application Laid-Open No. 2004-157417, because the emission amount of AF auxiliary illumination is constant, when the object resides at the very close position, the reflected light of the AF auxiliary illumination is so bright that the solid-state image pickup element is so-called saturated, whereby there was a drawback that the accurate photometric value could not be obtained. Thereby, in the digital camera of Japanese Patent Application Laid-Open No. 2004-157417, there was another drawback that the accurate AF control may not be made depending on the position of the object, and the emission amount for the object in the short range is so large that the emission current is wasteful.

This invention has been achieved in the light of these circumstances, and it is an object of the invention to provide a camera with AF auxiliary illumination that can direct the AF auxiliary illumination having the optimal light quantity to the object.

In order to accomplish the above object, according to a first aspect of the present invention, there is provided a camera with AF auxiliary illumination in which the focus position of an image taking lens is AF controlled to bring an object into focus, based on contrast information of an image acquired from an image pickup device, and if the photometric value of the object is less than a predetermined value, an AF auxiliary illumination is directed to the object, wherein the AF auxiliary illumination reflected from the object is measured, in which if the photometric value is greater than or equal to a specified value, the AF auxiliary illumination is dimmed out, and the emission amount of the AF auxiliary illumination is controlled based on the focus position of the image taking lens.

With the first aspect of the invention, the AF auxiliary illumination reflected from the object is measured, and if the photometric value is greater than or equal to the specified value, the AF auxiliary illumination is dimmed out to have the reasonable light quantity of AF auxiliary illumination, whereby the proper AF control is achieved. Also, the emission amount of AF auxiliary illumination is controlled based on the focus position of the image taking lens. That is, when the object is in the short range, the AF auxiliary illumination is dimmed out, whereas when the object is the long range, the brightness of AF auxiliary illumination is increased. Thereby, the emission amount can be appropriately controlled depending on the position of the object, so that the wasteful emission current can be suppressed and the energy saving achieved.

The reflected light of AF auxiliary illumination can be measured with an image pickup device such as a CCD, CMOS and so on. Also, the emission amount of AF auxiliary illumination can be controlled by regulating the emission current fed to a light emission part or the DUTY ratio. Further, the proper emission amount in the distance to one point is acquired beforehand, and the emission amount is made proportional to the square of the distance, according to the distance up to the object, whereby the proper emission amount can be obtained. Also, the proper emission amounts in the distance to at least two points may be acquired beforehand, and the emission amount may be interpolated according to the distance.

According to a second aspect of the invention, there is provided the camera with AF auxiliary illumination according to the first aspect, wherein when the AF evaluation value of the camera with AF auxiliary illumination changes, and the image taking lens comes near a peak of focus, the light quantity of the AF auxiliary illumination is stopped from changing.

With the second aspect of the invention, when the AF evaluation value of the camera with AF auxiliary illumination changes, and the image taking lens comes near the peak of focus, the light quantity of the AF auxiliary illumination is stopped from changing. Thereby, a disturbance in the AF evaluation value caused by the changing AF auxiliary illumination is removed, so that the focus position can be detected accurately.

According to a third aspect of the invention, there is provided the camera with AF auxiliary illumination according to the first or second aspect, wherein if the photometric value of the AF auxiliary illumination reflected from the object exceeds a specified level, it is judged that the object is in the short range, and the AF control of the image taking lens is performed from the near distance side.

With the third aspect of the invention, if the photometric value of the AF auxiliary illumination reflected from the object exceeds a specified level, it is judged that the object is in the short range, and the AF control of the image taking lens is performed from the near distance side, whereby the AF operation is faster at the lightness in the environment where the lighting of the auxiliary illumination is needed. As a matter of course, if the photometric value of the AF auxiliary illumination reflected from the object is less than or equal to the specified level, it is judged that the object is in the long range, and the AF control of the image taking lens is performed from the far distance side.

According to a fourth aspect of the invention, there is provided the camera with AF auxiliary illumination according to any one of the first, second or third aspects, wherein if the photometric value of the AF auxiliary illumination reflected from the object exceeds the specified level, it is judged that the object is in the short range, and the emission amount of a stroboscope is controlled to be dimmed out.

With the fourth aspect of the invention, if the photometric value of the AF auxiliary illumination reflected from the object exceeds the specified level, it is judged that the object is in the short range, and the emission amount of a stroboscope is controlled to be dimmed out, whereby the white photographing of the object is prevented.

In the case where a stroboscope with a structure composed of a plurality of LEDs is applied, one LED in vicinity of the image taking lens may be effectively used as a light source that emits the AF auxiliary illumination.

According to a fifth aspect of the invention, there is provided the camera with AF auxiliary illumination according to any one of the first, second, third or fourth aspects, wherein if the photometric value of the AF auxiliary illumination reflected from the object is at the almost highest value, a photographing mode is switched to a macro mode.

With the fifth aspect of the invention, if the photometric value of the AF auxiliary illumination reflected from the object is at the almost highest value, the photographing mode is switched to the macro mode, whereby the automatic macro photographing in the closest focusing distance (e.g., 70 cm, 50 cm) is allowed.

With the camera with AF auxiliary illumination according to the invention, the AF auxiliary illumination reflected from the object is measured, and if the photometric value is greater than or equal to the specified value, the AF auxiliary illumination is dimmed out to have a reasonable light quantity, whereby the accurate AF control is achieved. Also, since the emission amount of AF auxiliary illumination is controlled based on the focus position of the image taking lens, the wasteful emission current can be suppressed and the energy saving achieved.

DETAILED DESCRIPTION OF THE PREFERRED EMBODIMENTS

The preferred embodiments of a camera with AF auxiliary illumination according to the present invention will be described below with reference to the accompanying drawings.

Figure 1:
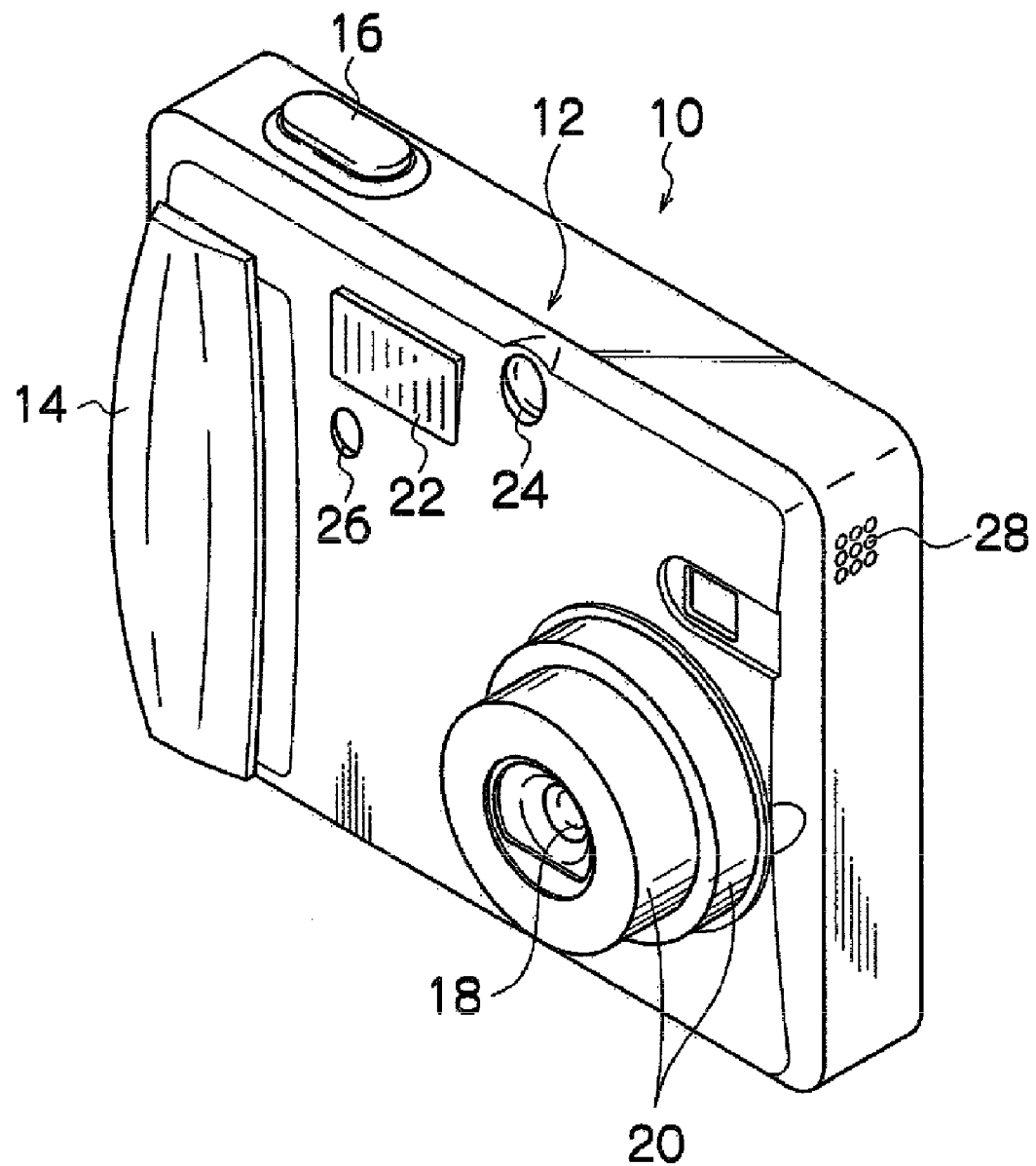
FIG. 1 is a perspective view of a camera with AF auxiliary illumination according to an embodiment of the present invention, as seen from the front side.
Figure 2:
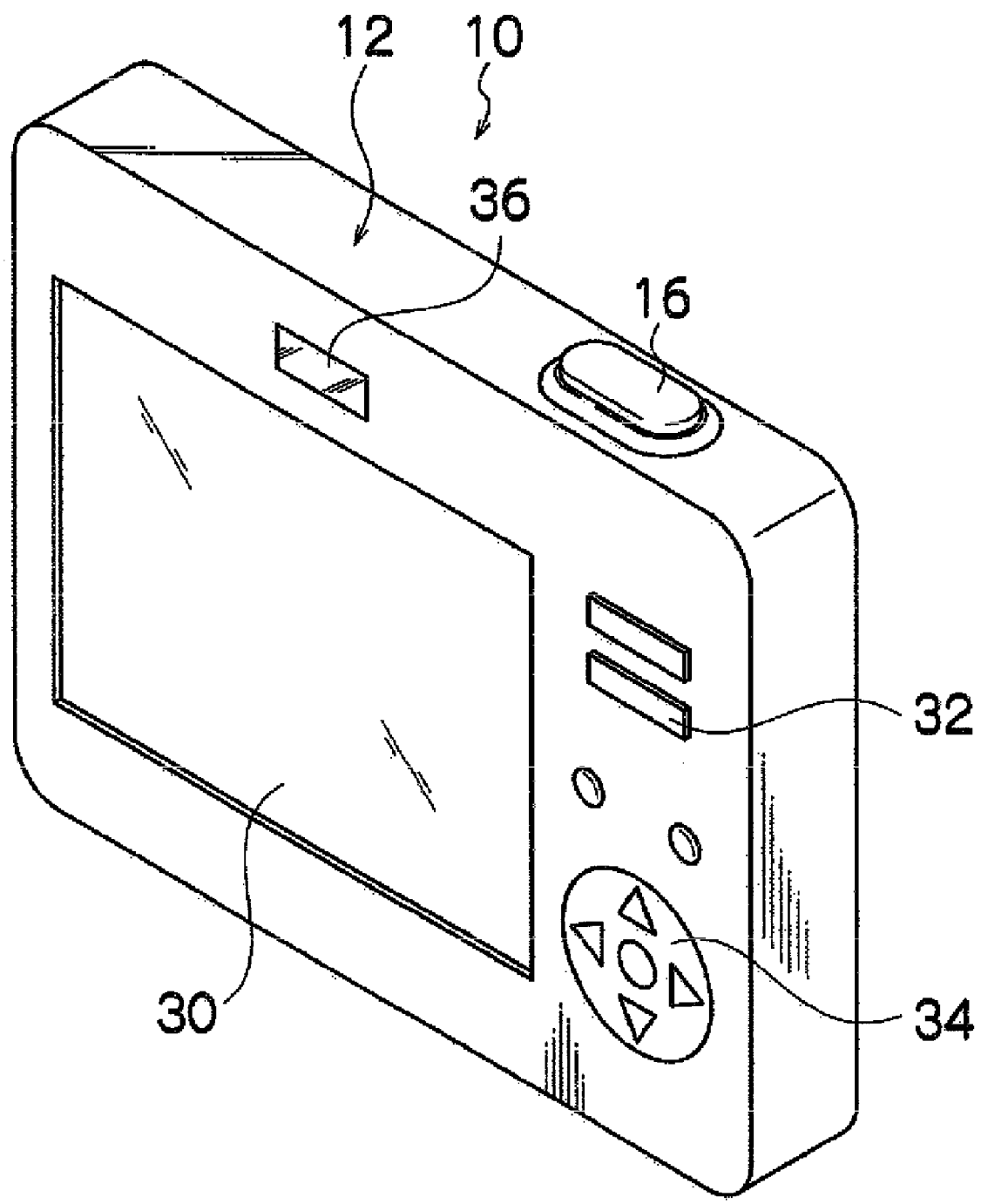
FIG. 2 is a perspective view of the camera with AF auxiliary illumination as shown in FIG. 1, as seen from the rear side.
Figure 3:
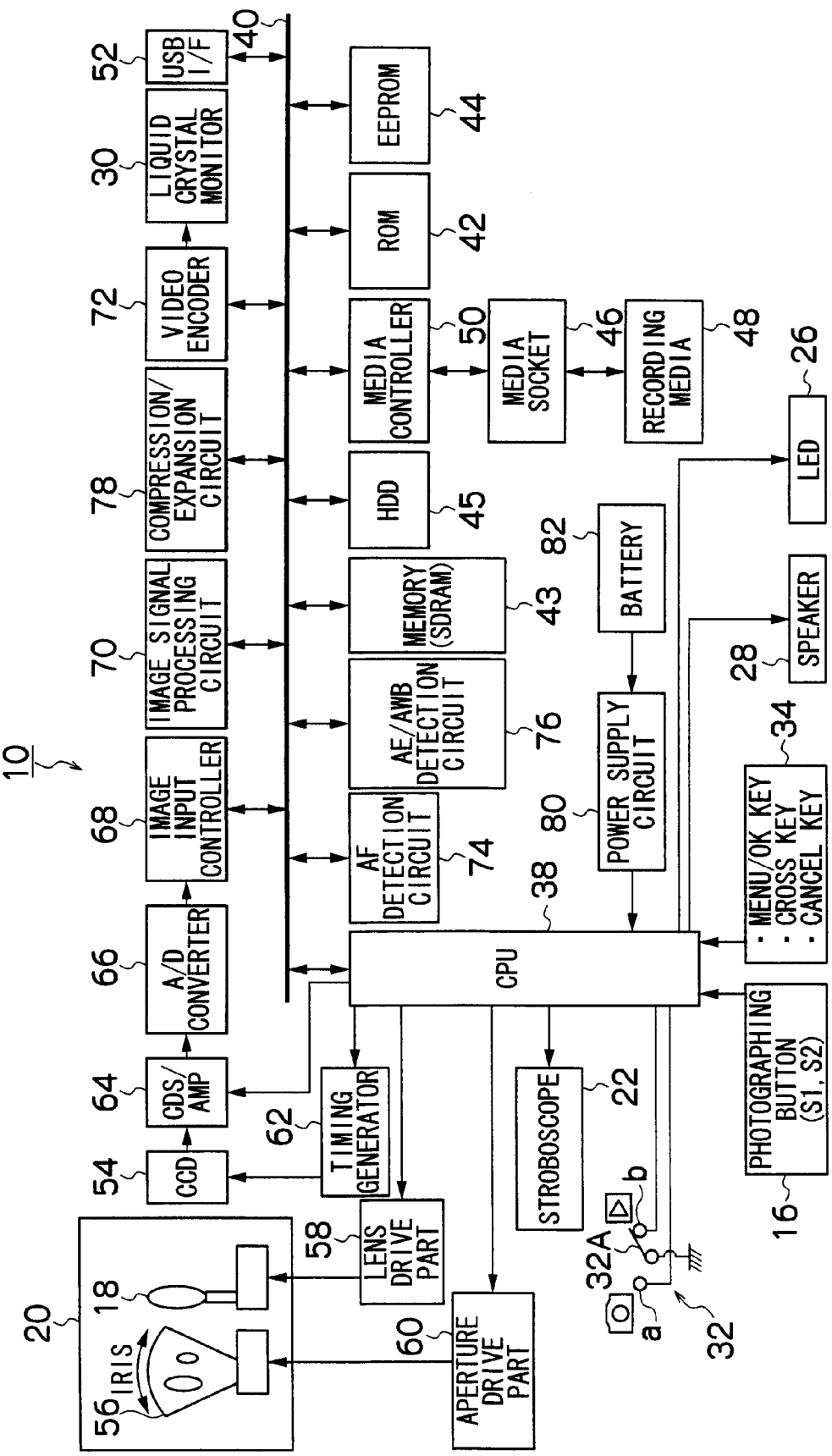
FIG. 3 is a block diagram showing the overall configuration of the camera with AF auxiliary illumination as shown in FIG. 1.

FIG. 1 is a perspective view of a digital camera 10 that is a camera with AF auxiliary illumination according to an embodiment of the invention, as seen from the front side. FIG. 2 is a perspective view of the digital camera 10, as seen from the rear side. Also, FIG. 3 is a block diagram showing the overall configuration of the digital camera 10.

A camera main body 12 of the digital camera 10 is formed in a flat rectangular parallelepiped shape, with a grip portion 14 swollen forward at the left side on the front face, as shown in FIGS. 1 and 2. Also, a photographing button 16 is disposed on an upper surface of the camera main body 12 where the grip portion 14 is located. This photographing button 16 is provided at a position operable by the photographer who grips the grip portion 14 with a forefinger of the right hand. Further, a two-stage lens barrel 20 of collapsed/extended type, which holds the image taking lens 18, protrudes at the right side on the front face of the camera main body 12. Furthermore, a strobe light flashing part 22 having a xenon tube is provided in an upper left portion on the front face of the camera main body 12, and an objective part 24 of an optical finder and an LED 26 that is an emission part of AF auxiliary illumination are disposed near the strobe light flashing part 22. This LED 26 emits an AF auxiliary illumination toward the object when the photographing button 16 is depressed halfway, if the photometric value of the object measured by a CCD 54 as will be described later is less than a predetermined value. The photographing button 16 is not necessarily depressed halfway, but a state where the photographing button 16 is contacted with a finger is detected by a capacitance sensor or the like to emit the AF auxiliary illumination during this contact.

A speaker 28 is provided on the side face of the camera main body 12. On the other hand, a liquid crystal monitor 30, various kinds of switches including a mode selection switch 32 and a cross key 34, and an eyepiece 36 for the optical finder are provided at respective predetermined positions on the rear face of the camera main body 12, as shown in FIG. 2.

In this digital camera 10, one of the photographing operations of still image photography, moving picture photography and continuous photography (continuous exposure), is selected by operating the mode selection switch 32. If the still image photographing operation is selected, the object is photographed for each frame by depressing the photographing button 16. Also, if the moving picture photographing operation is selected, the moving picture (Motion JPEG) can be taken, while the photographing button 16 is being depressed. Further, if the continuous photographing operation is selected by the mode selection switch 32, the continuous exposure is continued while the photographing button 16 is being depressed, and the photographing for plural frames is made if the finger is raised from the photographing button 16.

The overall operation of the digital camera 10 is generally controlled by a central processing unit (CPU) 38, as shown in FIG. 3. The CPU 38 functions as a control device which controls a camera system in accordance with a predetermined program, and also as an arithmetic operation device which performs various arithmetic operations for automatic exposure (AE), automatic focusing (AF) and white balance (WB) adjustment.

A ROM 42 connected via a bus 40 to the CPU 38 stores a program performed by the CPU 38 and various kinds of data required for the control, and an EEPROM 44 stores CCD pixel defect information and various kinds of constant/information on the camera operation.

Also, a memory (SDRAM) 43 is used as an expansion area of the program and a working area for arithmetic operation of the CPU 38, and as a temporary storage area of image data and voice data for still image and moving picture. An HDD (hard disk drive unit) 45 is a temporary storage memory dedicated for image data. The memory 43 and the HDD 45 may be shared.

The mode selection switch 32 is an operation device which switches between a photographing mode of still image photography, moving picture photography or continuous photography (continuous exposure) and a reproduction mode. If a movable armature 32A is connected with contact point a by operating the mode selection switch 32, a signal is inputted into the CPU 38, so that the digital camera 10 is set in the photographing mode. Also, if the movable armature 32A is connected with contact point b, the digital camera 10 is switched to the reproduction mode of reproducing the already recorded image.

The photographing button 16 is an operation button which inputs a photographing start instruction, and comprises a two-stage stroke switch having an S1 switch that is turned on when depressed halfway and an S2 switch that is turned on when depressed all the way.

A menu/OK key (not shown in FIG. 2) is an operation key having both a function of menu button which issues a command of displaying the menu on the screen of the liquid crystal monitor 30, and a function of OK button which issues a command of settling and performing the selected content. A cross key 34 is an operation part which inputs one of four directions, up, down, left and right, and functions as a button for use to select an item from the menu screen or select setting items from each menu. One of the photographing operations of still image photography, moving picture photography and continuous photography (continuous exposure) is selected by this cross key 34, and the selected photographing operation is decided by a depressing operation of the menu/OK key. A cancel key (not shown in FIG. 2) is used to delete the desired object such as selection item, cancel the directed contents, or restore the operation to the previous operation state.

The liquid crystal monitor 30 is also used as a user interface display screen to display the information such as menu information, selected item or setting contents, as needed. Though this liquid crystal monitor 30 is a liquid crystal display, other display devices such as an organic EL may be substituted.

The digital camera 10 has a media socket 46. A recording media 48 can be mounted in the media socket 46. The recording media 48 is not specifically limited in the form, but may be various kinds of media such as a semiconductor memory card represented by smart media (trade mark), a portable small hard disk, a magnetic disk, an optical disk, and an optical magnetic disk.

A media controller 50 performs required signal conversion to receive or pass an input/output signal suitable for the recording media 48 mounted in the media socket 46.

Also, the digital camera 10 has a USB interface part 52 as a communication device for connection to a personal computer or other external apparatus. If the digital camera 10 is connected to the external apparatus using the USB cable, the digital camera can receive or pass data from or to the external apparatus. Of course, the communication method is not limited to the USB, but other communication methods may be applied.

Next, the photographing function of the digital camera 10 will be described below.

If the photographing mode is selected by the mode selection switch 32, power is supplied to an image pickup part comprising a color CCD solid-state image pickup element (hereinafter described as a CCD) 54, so that the digital camera is ready to perform the still image, moving picture or continuous photographing. Thereafter, one of the photographing operations of still image photography, moving picture photography and continuous photography (continuous exposure) is selected by the cross key 34, and the selected photographing operation is decided by depressing the menu/OK key.

A lens barrel 20 is an optical unit comprising an image taking lens 18 having a focus lens and an aperture and mechanical shutter 56. The lens barrel 20 is electrically driven by a lens drive part 58 and an aperture drive part 60 which are controlled by the CPU 38, making the zoom control, focus control and iris control.

A beam of light passing through the image taking lens 18 is imaged on a light receiving plane of the CCD 54. A great number of photodiodes (photo-electric elements) are arranged in two dimensions on the light receiving plane of the CCD 54, and the color filters of primary colors of red (R), green (G) and blue (B) corresponding to each photodiode are arranged with a predetermined array structure. Also, the CCD 54 has an electronic shutter function of controlling the charge accumulation time (shutter speed) of each photodiode. The CPU 38 controls the charge accumulation time in the CCD 54 via a timing generator 62. Instead of the CCD 54, other image pickup elements such as MOS type may be used.

An object image formed on the light receiving plane of the CCD 54 is converted into signal charges of the amount corresponding to the incident light quantity by each photodiode. The signal charges stored in each photodiode are sequentially read out as a voltage signal (image signal) corresponding to the signal charges based on a drive pulse given from the timing generator 62 upon a command of the CPU 38.

A signal outputted from the CCD 54 is sent to an analog processing part (CDS/AMP) 64, where the R, G and B signals for each pixel are sampled and held (correlated dual sampling process), amplified, and added to an A/D converter 66. The R, G and B signals converted successively into digital signals by the A/D converter 66 are stored in a memory 43 via an image input controller 68.

An image signal processing circuit 70 processes the R, G and B signals stored in the memory 43 in accordance with a command of the CPU 38. That is, the image signal processing circuit 70 functions as an image processing device comprising a synchronization circuit (processing circuit which converts the color signals synchronously by interpolating a spatial displacement of the color signals caused by the color filter array of single plane CCD), a white balance correction circuit, a gamma correction circuit, a contour correction circuit, and a brightness/color difference signal generation circuit, and performs a predetermined signal processing by utilizing the memory 43 in accordance with a command from the CPU 38.

The RGB image data inputted into the image signal processing circuit 70 is converted into a brightness signal and color difference signals in the image signal processing circuit 70, and subjected to a predetermined processing such as gamma correction. The image data processed by the image signal processing circuit 70 is recorded in an HDD 45.

When the photographed image is outputted for monitor to the liquid crystal monitor 30, the image data is read from the HDD 45, and sent via the bus 45 to a video encoder 72. The video encoder 72 converts input image data into a signal for display in a predetermined format (e.g., NTSC color composite video signal) and outputs it to the liquid crystal monitor 30.

If the photographing button 16 is depressed halfway to turn on the S1, the digital camera 10 starts an AE and AF process. That is, an image signal outputted from the CCD 54 is A/D converted and then inputted into an AF detection circuit 74 and an AE/AWB detection circuit 76 via the image input controller 68.

The AE/AWB detection circuit 76 comprises a circuit which divides one screen into a plurality of (e.g., 16×16) areas and integrates the RGB signals for each division area to provide the integrated values to the CPU 38. The CPU 38 detects the object lightness (object brightness), based on the integrated values obtained from the AE/AWB detection circuit 76, and calculates the exposure value (photographing EV value) suitable for taking the image. The aperture value and the shutter speed are decided from the obtained exposure value in accordance with a predetermined program diagram. According to these values, the CPU 38 controls the electronic shutter and iris for the CCD 54 to obtain the fair exposure amount.

Also, the AE/AWB detection circuit 76 calculates the average integrated value for each color of the RGB signals in each division area at the time of automatic white balance adjustment, and provides its calculation results to the CPU 38. The CPU 38 obtains the R integrated value, the B integrated value and the G integrated value, acquires the ratios R/G and B/G for each division area, discriminates the light source species based on the distributions of R/G and B/G in the color space for R/G and B/G values, controls the gain value (white balance correction value) for the R, G and B signals in the white balance adjustment circuit, according to the white balance adjustment values suitable for the discriminated light source species, for example, so that the value of each ratio may be equal to about 1, and corrects the signal of each color channel. If the gain value of the white balance adjustment circuit is adjusted so that the value of each ratio may be other than 1, the image with some tone can be generated.

The AF control in the digital camera 10 applies the contrast AF which moves the focusing lens (movable lens contributing to focus adjustment in the optical system of lenses making up the image taking lens 18) so that the high frequency component of the G signal of video signal may be maximum. That is, the AF detection circuit 74 comprises a high pass filter that passes only the high frequency components of the G signal, an absolute value processing part, an AF area extraction part which cuts out the signal within a focus object area preset within the screen (e.g., a central part of the screen), and an integration part which integrates the absolute value data within the AF area.

The data of the integrated value obtained by the AF detection circuit 74 is notified to the CPU 38. The CPU 38 controls the lens drive part 58 to move the focusing lens, and calculates the focal point evaluation values (AF evaluation values) at a plurality of AF detection points to decide the lens position at which the evaluation value is maximum as the focused position. And the lens drive part 58 is controlled to move the focusing lens to the obtained focused position. The calculation of the AF evaluation value is not limited to the use of the G signal, but may use the brightness signal (Y signal).

If the photographing button 16 is depressed halfway to turn on the S1, the AE/AF process is performed, and if the photographing button 16 is depressed all the way to turn on the S2, the photographing operation for recording is started. The image data acquired in response to turning on the S2 is converted into the brightness/color difference signals (Y/C signal) in the image signal processing circuit 70, subjected to a predetermined process such as gamma correction, and stored in the memory 43.

The Y/C signal stored in the memory 43 is compressed in a predetermined format by a compression expansion circuit 78, and recorded in the recording media 48 via the media controller 50. For example, the image is recorded in a JPEG format.

If the reproduction mode is selected by the mode selection switch 32, the compressed data of the last image file (lastly recorded file) recorded in the recording media 48 is read. In the case where the lastly recorded file is the still image file, this read image compressed data is expanded to uncompressed YC signals via the compression expansion circuit 78, converted into the display signal via the image signal processing circuit 70 and the video encoder 72 and outputted to the liquid crystal monitor 30. Thereby, the image contents of the file are displayed on the screen of the liquid crystal monitor 30.

The file to be reproduced can be switched (forward frame advance/reverse frame advance) by operating the right key or left key of the cross key during reproduction of one frame of the still image (during reproduction of the first frame of moving picture). The image file at the frame advanced position is read from the recording media 48, so that the still image or moving picture is reproduced and displayed on the liquid crystal monitor 30 in the same manner as above. The digital camera 10 is driven by power of a battery 82 supplied via a power supply circuit 80.

By the way, the digital camera 10 of the embodiment AF controls the focus position of the image taking lens 18 to bring the object into focus, based on the contrast information of the image obtained from the CCD 54, in which when the photographing button 16 is depressed halfway, the AF auxiliary illumination is directed from the LED 26 toward the object if the photometric value of the object obtained from the CCD 54 is less than a predetermined value. And this digital camera 10 measures the AF auxiliary illumination reflected from the object with the CCD 54, in which if the photometric value is greater than or equal to a specified value, the AF auxiliary illumination is dimmed out, and the emission amount of AF auxiliary illumination is controlled by the CPU 38, based on the focus position of the image taking lens 18.

In this manner, with the digital camera 10 which controlling the emission amount of AF auxiliary illumination to be dimmed out, if the photometric value of AF auxiliary illumination reflected from the object is greater than or equal to the specified value, the AF auxiliary illumination is dimmed out to make the AF auxiliary illumination the reasonable light quantity, whereby the fair AF control can be made. Also, the emission amount of AF auxiliary illumination is controlled based on the focus position of the image taking lens 18. That is, when the object is in the short range, the AF auxiliary illumination is dimmed out, whereas when the object is in the long range, the brightness of AF auxiliary illumination is increased. Thereby, the AF auxiliary illumination can be controlled to the appropriate emission amount according to the position of the object, whereby the wasteful emission current can be suppressed and the energy saving attained.

Figure 4:
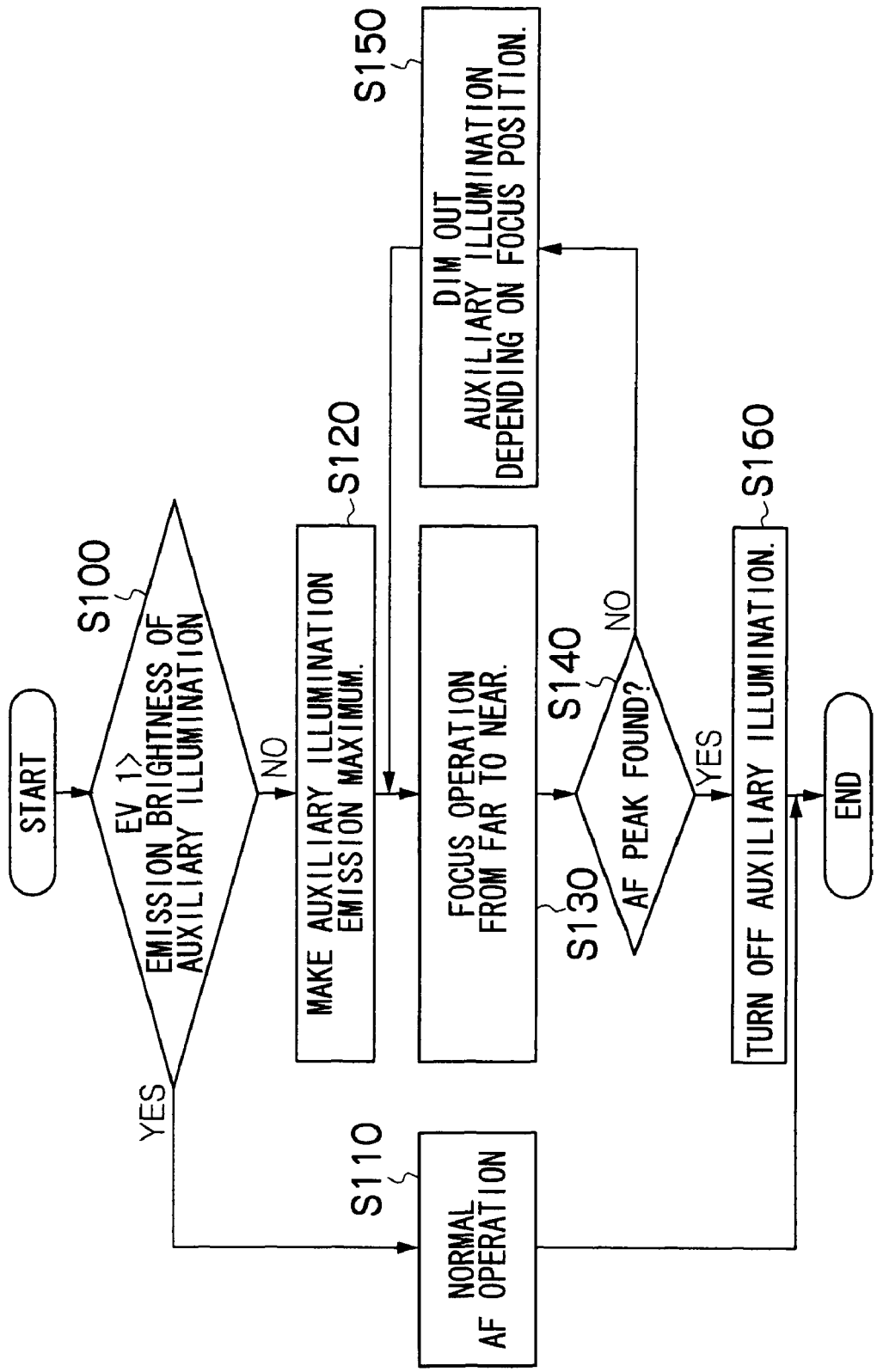
FIG. 4 is a flowchart showing one example of AF auxiliary illumination control for the digital camera 10.

FIG. 4 is a flowchart showing one example of AF auxiliary illumination control for the digital camera 10, and an explanatory view where the AF operation is set from the far side to the near side.

In FIG. 4, if the brightness of EV1 (natural light) measured by the CCD 54 is higher than the emission brightness of auxiliary illumination preset in the digital camera 10 (step S100), the normal AF operation is performed without emitting the auxiliary illumination from the LED 26 (S 110), whereby the operation transfers to the photographing by the photographing button 16. And if the emission brightness of auxiliary illumination is higher than EV1 (S100), the brightness of auxiliary illumination is set at maximum and the auxiliary illumination is directed (S120). The AF operation is performed from the far side to the near side (S130), and the auxiliary illumination is dimmed out according to the focus position (S150) until the AF peak is detected (found) (S140). And if the AF peak is detected (S140), the auxiliary illumination is turned off (S160), and the operation transfers to the photographing by the photographing button 16.

Figure 5:
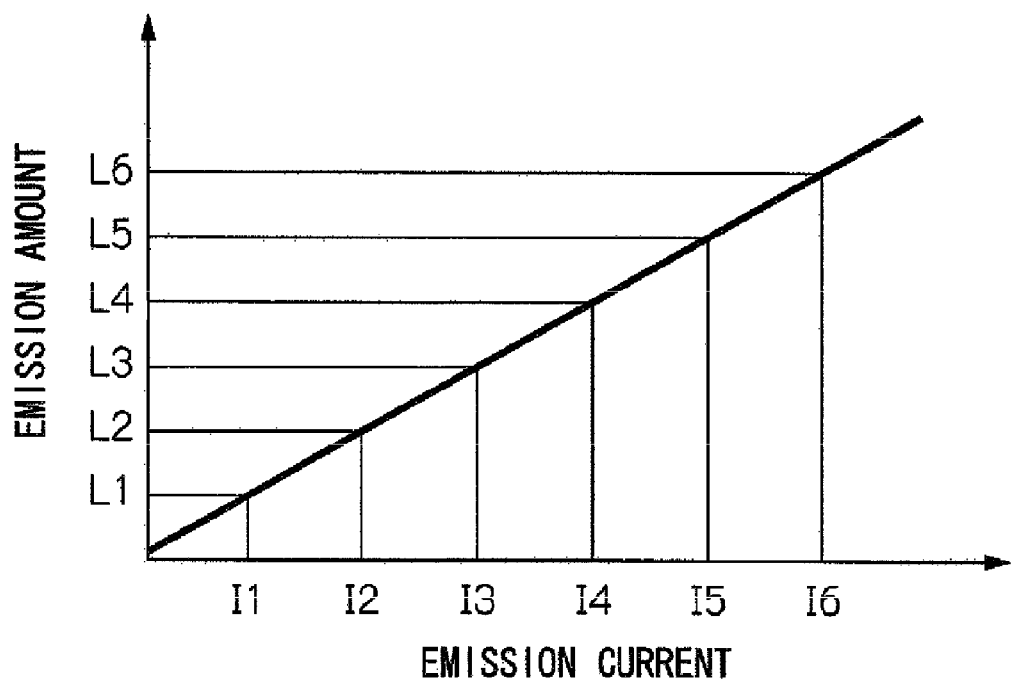
FIG. 5 is a graph showing the relationship between emission current and emission amount.
Figure 6:
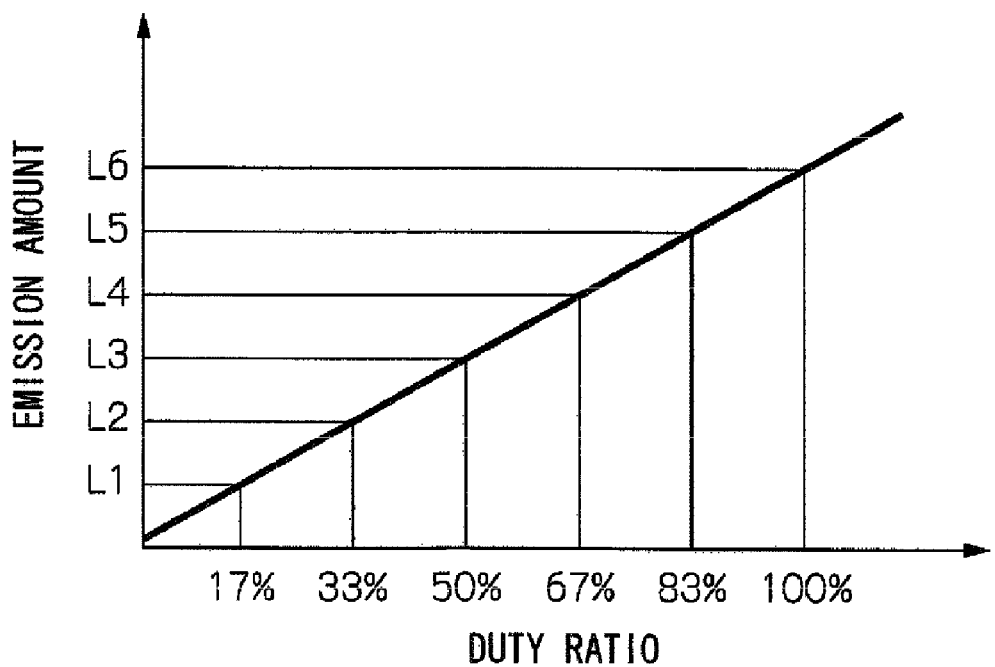
FIG. 6 is a graph showing the relationship between DUTY ratio and emission amount.

The control for the emission amount of AF auxiliary illumination can be made by regulating the emission current fed to the emission part as shown in the graph of FIG. 5, or the DUTY ratio as shown in FIG. 6. As can be seen from FIGS. 5 and 6, the emission current and the DUTY ratio are in proportional relation to the emission amount.

Also, the proper emission amount in a certain distance is acquired beforehand, and the emission amount is made proportional to the square of the distance according to the distance to the object to acquire the proper emission amount, as represented in the following expression.

$$I = I_0 \times (L/L_0)^2$$

I: emission amount of auxiliary illumination
$I_0$: emission amount of auxiliary illumination measured beforehand
L: distance to the object
$L_0$: distance measured beforehand Further, the proper emission amount in the distance to at least two points may be acquired beforehand, and the emission amount may be interpolated according to the distance, as represented in the following expression.

$$I = (I_0 - I_1)/(L_0 - L_1) \times L$$

I: emission amount of auxiliary illumination
$I_0, I_1$: emission amount of auxiliary illumination measured beforehand
L: distance to the object
$L_0, L_1$: distance measured beforehand On the other hand, this digital camera 10 is changed in the AF evaluation value and controlled by the CPU 38 to stop the light quantity of AF auxiliary illumination from changing when the image taking lens 18 comes closer to the peak of focus. Thereby, a disturbance in the AF evaluation value caused by the change of AF auxiliary illumination is removed, so that the focus position can be detected accurately.

Figure 7:
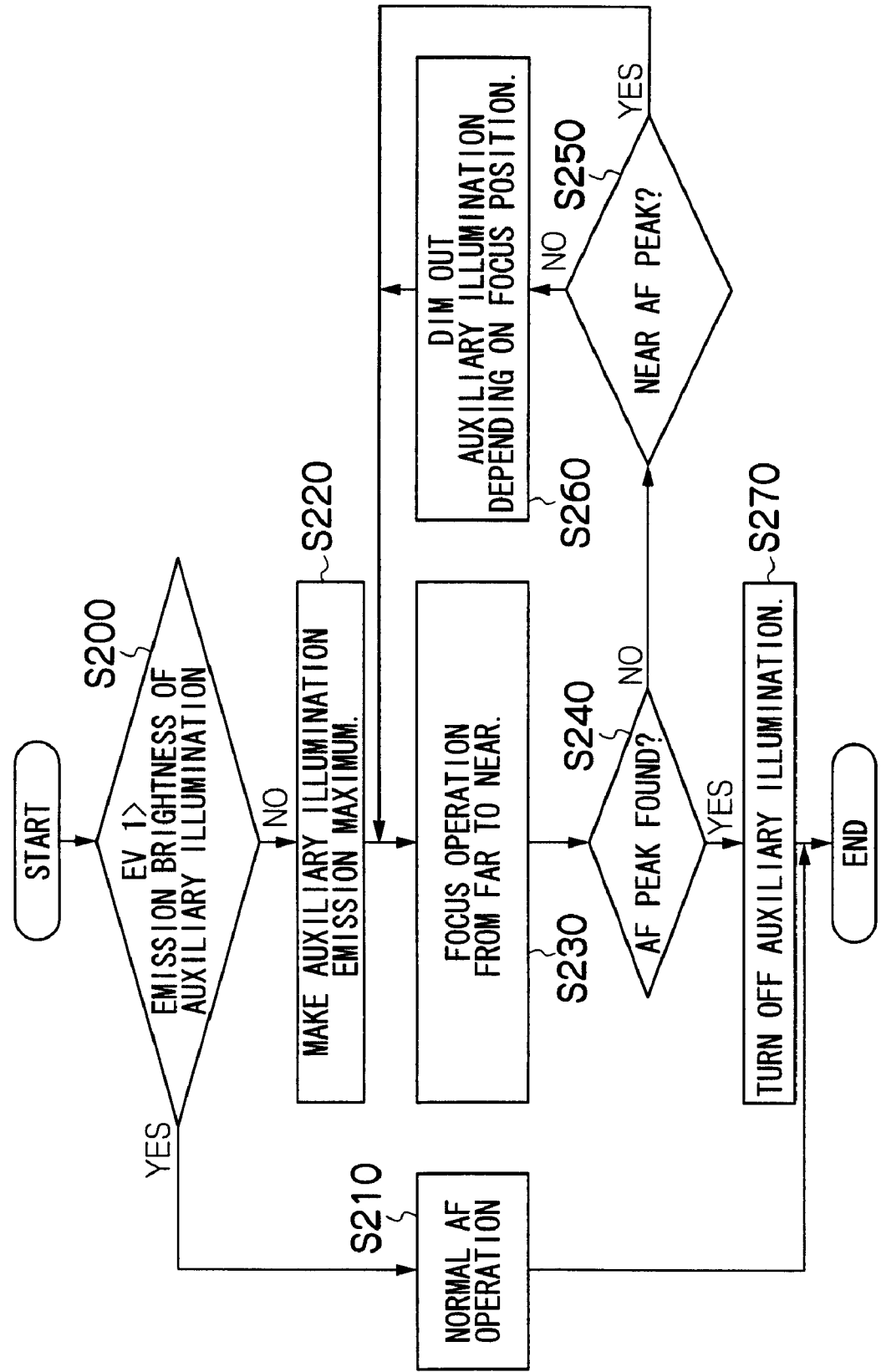
FIG. 7 is a flowchart showing one example of stopping a change in the light quantity of AF auxiliary illumination in the digital camera.

FIG. 7 is a flowchart showing one example of stopping the change in the light quantity of AF auxiliary illumination in the digital camera 10, and an explanatory view where the AF operation is set from the far side to the near side.

In FIG. 7, if the brightness of EV1 measured by the CCD 54 is higher than the emission brightness of auxiliary illumination preset in the digital camera 10 (S200), the normal AF operation is performed without emitting the auxiliary illumination from the LED 26 (S210), whereby the operation transfers to the photographing by the photographing button 16. And if the emission brightness of auxiliary illumination is higher than EV 1 (S200), the brightness of auxiliary illumination is set at maximum and the auxiliary illumination is directed (S220). The AF operation is performed from the far side to the near side (S230), and the auxiliary illumination is dimmed out according to the focus position (S260) until the AF peak is not detected (S240) and the AF peak is approached (S250). And if the AF peak is approached (S250), the dimming of auxiliary illumination is stopped (change in the light quantity of auxiliary illumination is stopped), and the AF operation is performed from the far side to the near side (S230). If the AF peak is detected (S240), the auxiliary illumination is turned off (S270), and the operation transfers to the photographing by the photographing button 16. Thereby, a disturbance in the AF evaluation value caused by the change in the light quantity of AF auxiliary illumination is removed, so that the focus position can be detected accurately.

Also, if the photometric value of AF auxiliary illumination reflected from the object exceeds a specified level, the CPU 38 judges that the object is in the short range, whereby this digital camera 10 is controlled so that the AF control for the image taking lens 18 may be performed from the near distance side.

Thereby, the AF operation is faster at the lightness in the environment where the lighting of auxiliary illumination is needed. As a matter of course, if the photometric value of AF auxiliary illumination reflected from the object is less than or equal to the specified level, the CPU 38 judges that the object is in the long range, whereby the AF control for the image taking lens 18 is performed from the far distance side.

Figure 8:
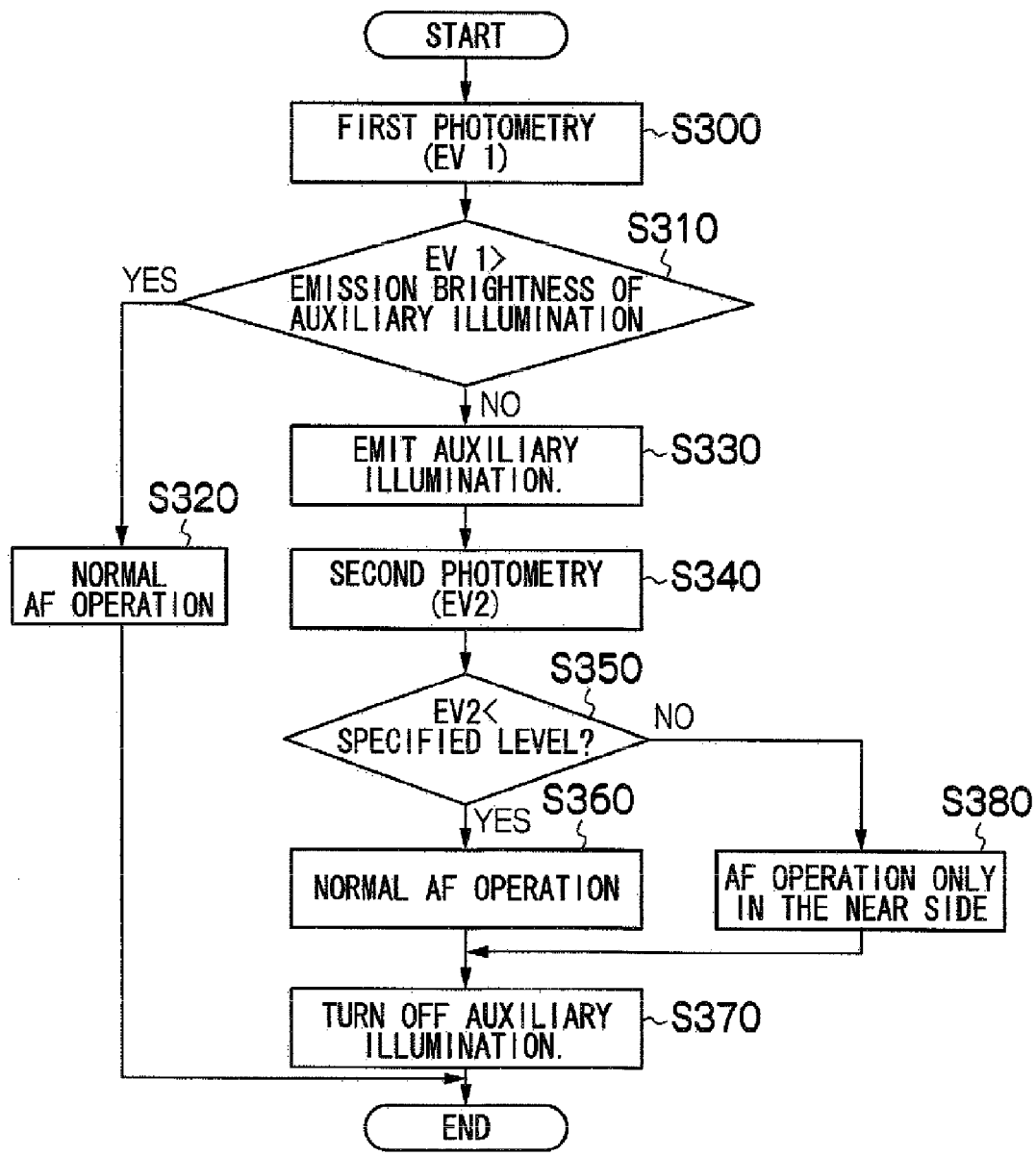
FIG. 8 is a flowchart showing one example of the operation of the digital camera where the object is in the short range.

FIG. 8 is a flowchart showing one example of the operation of the digital camera 10 where the object is in the short range.

In FIG. 8, the first photometry (EV1) is performed by the CCD 54 (S300). If this photometric value is higher than the emission brightness of auxiliary illumination preset in the digital camera 10 (step S310), the normal AF operation is performed without emitting the auxiliary illumination from the LED 26 (S320), whereby the operation transfers to the photographing by the photographing button 16. And if the emission brightness of auxiliary illumination is higher than EV1 (S310), the auxiliary illumination is directed (S330), and the second photometry (EV2) is performed (S340). And if EV2 is less than or equal to the specified level (S350), the normal AF operation is performed (S360), the auxiliary illumination is turned off (S370), and the operation transfers to the photographing by the photographing button. On the other hand, if EV2 is greater than or equal to the specified level (S350), the CPU 38 judges that the object is in the short range, whereby the AF operation only in the near side is performed (S380). Thereafter, the auxiliary illumination is turned off (S370), and the operation transfers to the photographing by the photographing button. Thereby, the AF operation is faster at the lightness in the environment where the lighting of auxiliary illumination is needed.

Furthermore, if the photometric value of AF auxiliary illumination reflected from the object exceeds the specified level, the CPU 38 judges that the object is in the short range, whereby this digital camera 10 is controlled to dim out the emission amount of the strobe light flashing part 22. Thereby, the strobe light is dimmed out when the object is in the short range, whereby the white photographing of the object is prevented.

Figure 9:
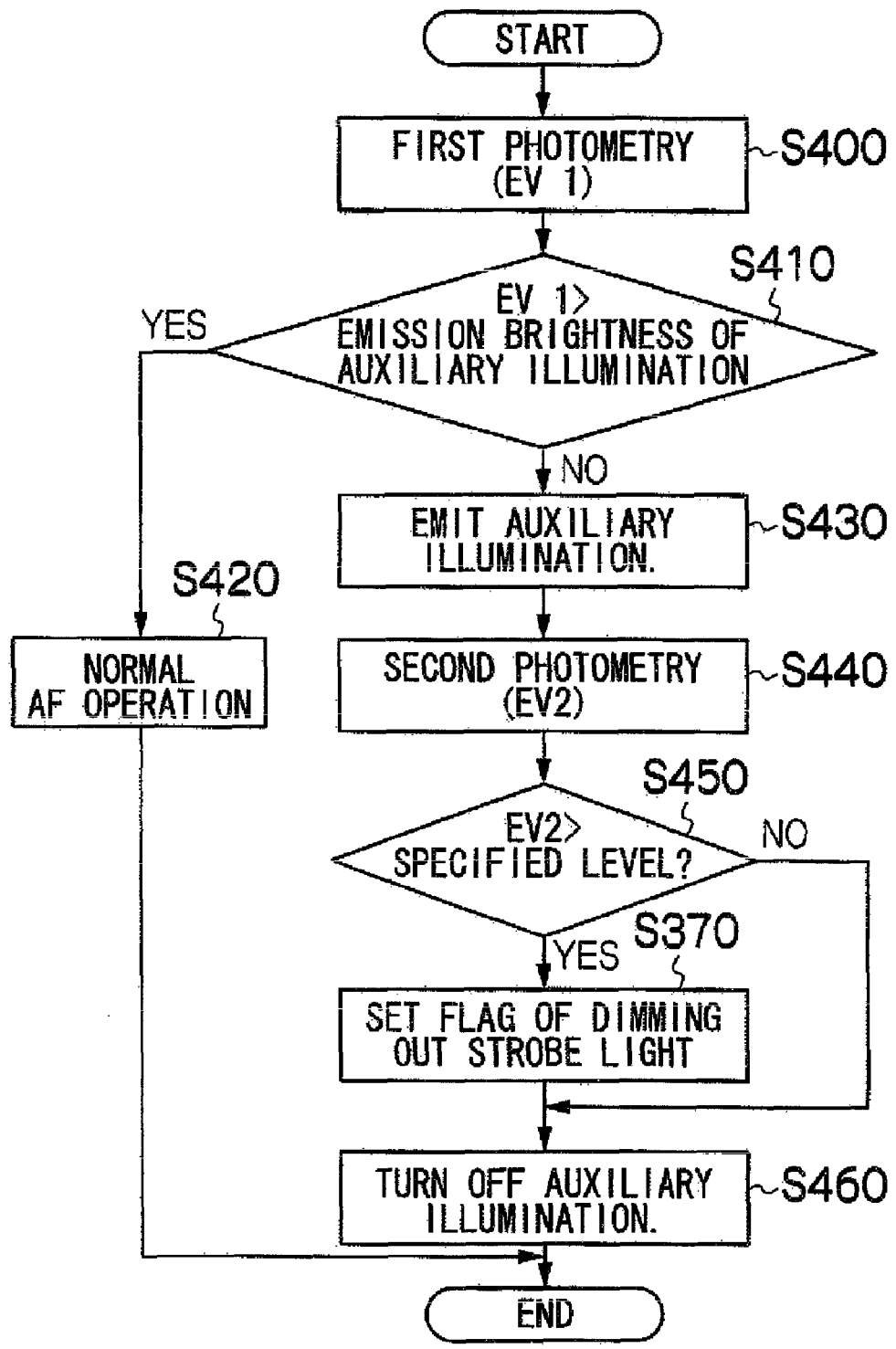
FIG. 9 is a flowchart showing one example of the operation of the digital camera where the object is in the short range.

FIG. 9 is a flowchart showing one example of the operation of the digital camera 10 where the object is in the short range.

In FIG. 9, the first photometry (EV1) is performed by the CCD 54 (S400). If this photometric value is higher than the emission brightness of auxiliary illumination preset in the digital camera 10 (step S410), the normal AF operation is performed without emitting the auxiliary illumination from the LED 26 (S420), whereby the operation transfers to the photographing by the photographing button 16. And if the emission brightness of auxiliary illumination is higher than EV1 (S410), the auxiliary illumination is directed (S430), and the second photometry (EV2) is performed (S440). And if EV2 is less than or equal to the specified level (S450), the CPU 38 judges that the object is in the long range, whereby the auxiliary illumination is turned off (S460), and the operation transfers to the photographing by the photographing button. On the other hand, if EV2 is greater than or equal to the specified level (S350), the CPU 38 judges that the object is in the short range, whereby a flag of dimming out the strobe light is set (S380). Thereafter, the auxiliary illumination is turned off (S460), and the operation transfers to the photographing by the photographing button. Thereby, it is possible to prevent the phenomenon that the object in the short range is photographed in white.

Also, this digital camera 10 is controlled to switch the photographing mode into the macro mode by the CPU 38, if the photometric value of AF auxiliary illumination reflected from the object is at the almost highest value. That is, the photometric value of reflected light of auxiliary illumination being at the almost maximum value means that the object is in the closest focusing distance, whereby the digital camera 10 automatically switches the photographing mode into the macro mode. Thereby, the automatic macro photographing in the closest focusing distance (e.g., 70 cm, 50 cm) is allowed.

Figure 10:
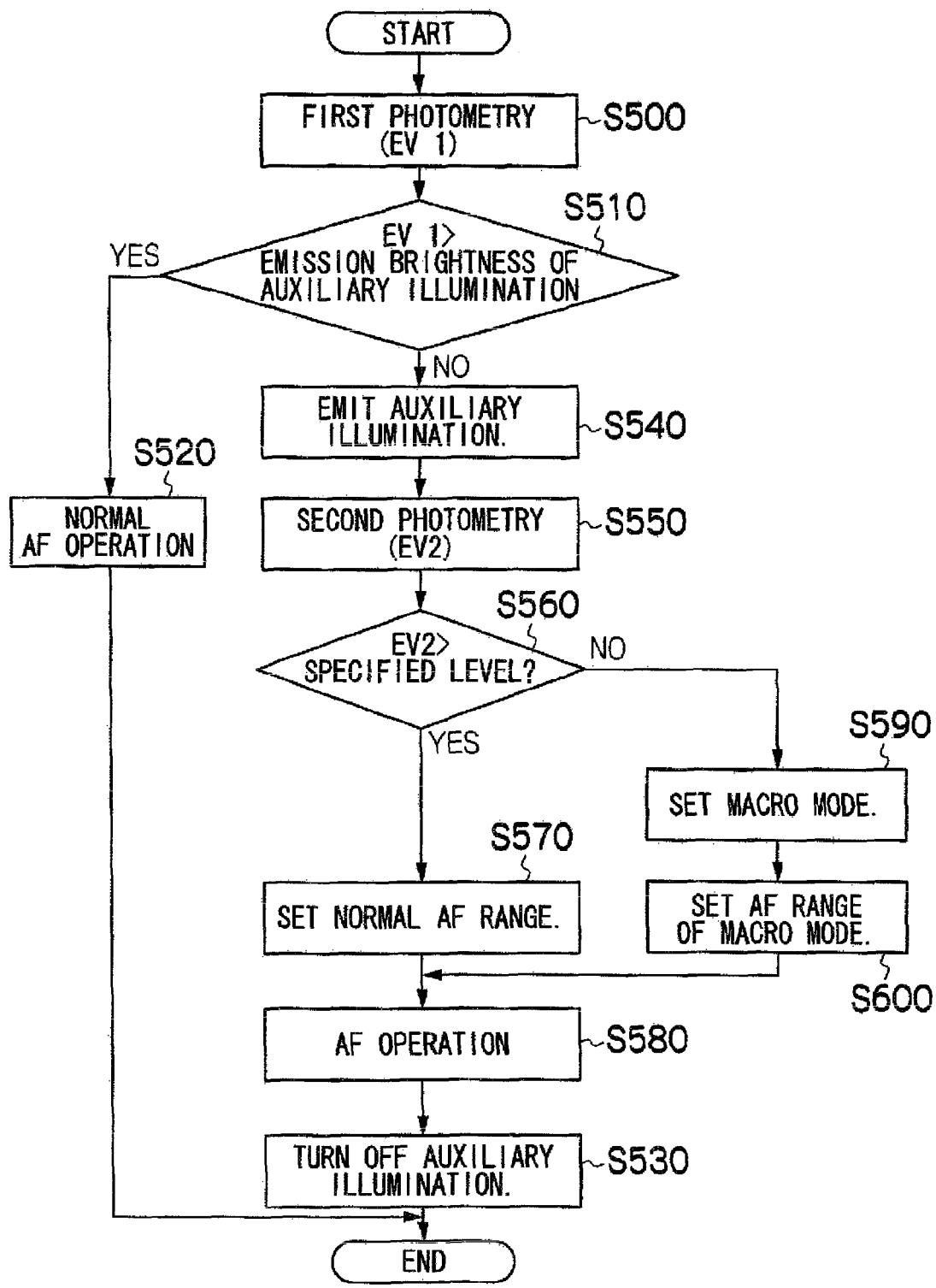
FIG. 10 is a flowchart showing one example of the operation of the digital camera at the time of switching to a macro photographing mode.

FIG. 10 is a flowchart showing one example of the operation of the digital camera 10 for automatically switching the photographing mode to the macro mode where the object is in the closet focusing distance.

In FIG. 10, the first photometry (EV1) is performed by the CCD 54 (S500). If this photometric value is higher than the emission brightness of auxiliary illumination preset in the digital camera 10 (step S510), the normal AF operation is performed without emitting the auxiliary illumination from the LED 26 (S520), whereby the auxiliary illumination is turned off (S530) and the operation transfers to the photographing by the photographing button 16. And if the emission brightness of auxiliary illumination is higher than EV1 (S510), the auxiliary illumination is directed (S540), and the second photometry (EV2) is performed (S550). And if EV2 is less than or equal to the specified level (S560), the CPU 38 judges that the object is not in the closest focusing distance, whereby the normal AF range is set (S570), the AF operation is performed (S580), the auxiliary illumination is turned off (S530), and the operation transfers to the photographing by the photographing button 16. On the other hand, if EV2 is greater than the specified level (S560), the CPU 38 judges that the object is in the closest focusing distance, whereby the macro mode is set (S590), and the macro mode AF range is set (S600). Thereafter, the AF operation is performed (S580), the auxiliary illumination is turned off (S530), and the operation transfers to the photographing by the photographing button. Thereby, the macro photographing for the object in the closest focusing distance is allowed.

That is, the above macro photographing switching method involves automatically transferring to the macro mode by judging the necessity of auxiliary illumination in the first photometry, and judging that the object is in the closest focusing distance if the brightness is greater than or equal to the specified level in the second photometry after emission of auxiliary illumination. At this time, the object is judged to reside at the near position as a matter of course, whereby the AF range is set to be narrow from the near distance so that the AF operation is ended rapidly.

Figure 11:
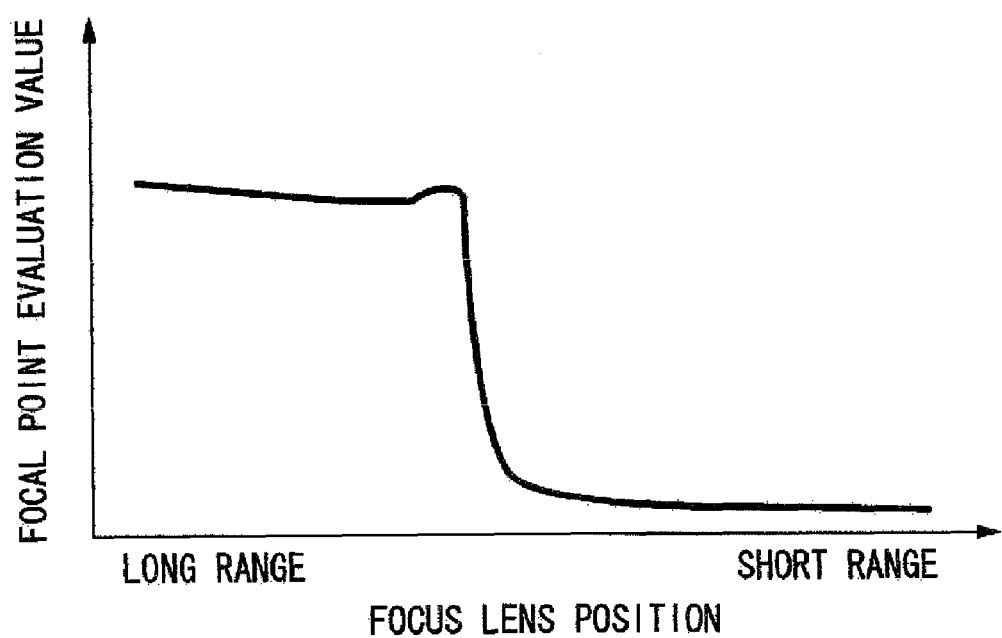
FIG. 11 is a graph showing the relationship between the focus lens position and the focal point evaluation value.

FIG. 11 is a graph showing the relationship between the position of the focus lens (image taking lens 18) and the focal point evaluation value. According to this graph, though the waveform up to the peak of focal point evaluation value is more or less different depending on the change in the emission amount of auxiliary illumination (emission amount is decreased from the far distance to the near distance), the evaluation value is high if the emission amount is large, and the contrast is large and the focal point evaluation value reaches the peak near the focused point. Thereafter, as the focus lens goes away from the object, the emission amount is smaller and the evaluation value rapidly falls. Thereafter, the peak position (object focused position) can be detected without problem. Also, if the emission amount continues to be decreased, the maximum evaluation value is attained at the focused point, and beyond that point, the evaluation value rapidly falls as the emission amount is decreased, whereby the peak of the focused point is easy to find.

Figure 12:
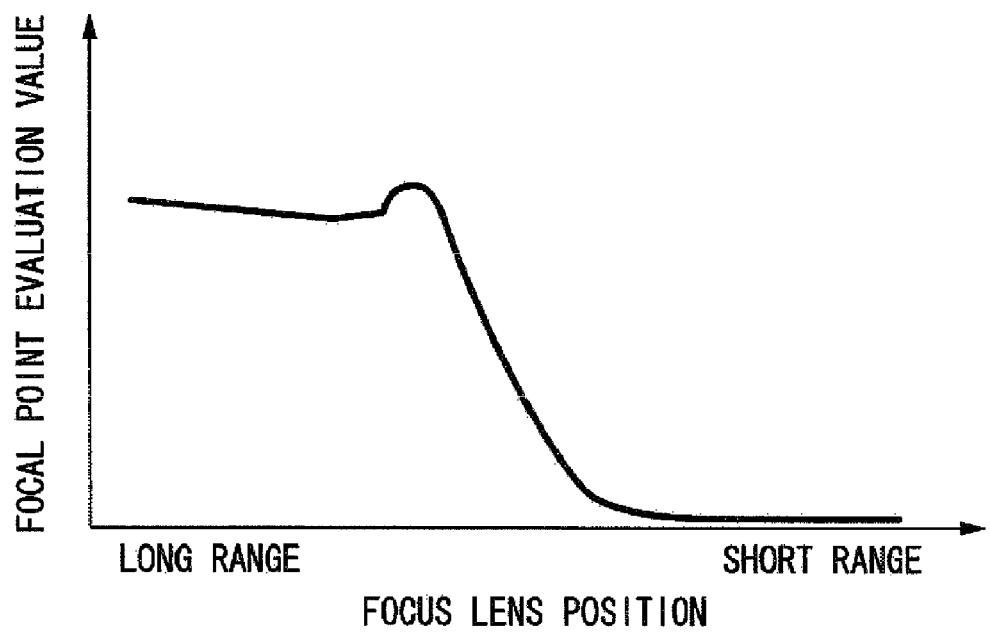
FIG. 12 is a graph showing the relationship between the focus lens position and the focal point evaluation value.

FIG. 12 is a graph showing the relationship between the position of the focus lens (image taking lens 18) and the focal point evaluation value. According to this graph, the waveform up to the peak of focal point evaluation value has a tendency of decreasing monotonously to the right as the emission amount of auxiliary illumination changes. Thus, at the point of time when the evaluation value increases after the end of monotonously decreasing, the emission amount is stopped from changing, and the AF operation is performed. Thereby, the evaluation value is further higher than the evaluation value at the focused point of FIG. 11, whereby the focusing position can be determined more accurately. If the emission amount continues to be decreased, the maximum evaluation value is lower, but by keeping the emission amount constant (stopping the decrease) when the evaluation value starts to increase, the larger evaluation value is obtained, whereby the peak of the focused point is easy to find.

What is claimed is:

1. A camera with AF auxiliary illumination, comprising:
   an image taking lens;
   an image pickup device for acquiring an image of an object through the image taking lens;
   an AF auxiliary illumination emitting device which emits an AF auxiliary illumination toward the object if a photometric value of the object is less than a predetermined value;
   a photometer which measures the AF auxiliary illumination reflected from the object to obtain a photometric value of the reflected AF auxiliary illumination;
   an AF auxiliary illumination controlling device which gradually decreases an emission amount of the AF auxiliary illumination if the photometric value of the reflected AF auxiliary illumination is greater than or equal to a first specified value so that the AF auxiliary illumination is dimmed out, and which controls the emission amount of the AF auxiliary illumination based on a focus position of the image taking lens; and
   an AF controlling device which controls the focus position of the image taking lens based on contrast information of the image acquired from the image pickup device while the emission amount of the AF auxiliary illumination is decreased.

2. The camera with AF auxiliary illumination according to claim 1, wherein
   the AF auxiliary illumination controlling device continues to decrease the emission amount of the AF auxiliary illumination until an AF evaluation value which is evaluated by the AF controlling device indicates that the image taking lens comes near a peak of focus.

3. The camera with AF auxiliary illumination according to claim 2, wherein if the photometric value of the AF auxiliary illumination reflected from the object exceeds a second specified value, it is judged that the object is in the short range, and the AF controlling device performs AF control of the image taking lens from a near distance side.

4. The camera with AF auxiliary illumination according to claim 3, wherein
if the photometric value of the AF auxiliary illumination reflected from the object exceeds a third specified value, it is judged that the object is in a short range, and an emission amount of a stroboscope is controlled to be dimmed out.

5. The camera with AF auxiliary illumination according to claim 4, wherein
if the photometric value of the AF auxiliary illumination reflected from the object is at the almost highest value, it is determined that the object is at a point-blank range, and a photographing mode is switched to a macro mode.

6. The camera with AF auxiliary illumination according to claim 3, wherein
if the photometric value of the AF auxiliary illumination reflected from the object is at the almost highest value, it is determined that the object is at a point-blank range, and a photographing mode is switched to a macro mode.

7. The camera with AF auxiliary illumination according to claim 2, wherein
if the photometric value of the AF auxiliary illumination reflected from the object exceeds a third specified value, it is judged that the object is in a short range, and an emission amount of a stroboscope is controlled to be dimmed out.

8. The camera with AF auxiliary illumination according to claim 7, wherein
if the photometric value of the AF auxiliary illumination reflected from the object is at the almost highest value, it is determined that the object is at a point-blank range, and a photographing mode is switched to a macro mode.

9. The camera with AF auxiliary illumination according to claim 2, wherein
if the photometric value of the AF auxiliary illumination reflected from the object is at the almost highest value, it is determined that the object is at a point-blank range, and a photographing mode is switched to a macro mode.

10. The camera with AF auxiliary illumination according to claim 1, wherein
if the photometric value of the AF auxiliary illumination reflected from the object exceeds a second specified value, it is judged that the object is in the short range, and the AF controlling device performs AF control of the image taking lens from a near distance side.

11. The camera with AF auxiliary illumination according to claim 10, wherein
if the photometric value of the AF auxiliary illumination reflected from the object exceeds a third specified value, it is judged that the object is in a short range, and an emission amount of a stroboscope is controlled to be dimmed out.

12. The camera with AF auxiliary illumination according to claim 11, wherein
if the photometric value of the AF auxiliary illumination reflected from the object is at the almost highest value, it is determined that the object is at a point-blank range, and a photographing mode is switched to a macro mode.

13. The camera with AF auxiliary illumination according to claim 10, wherein
if the photometric value of the AF auxiliary illumination reflected from the object is at the almost highest value, it is determined that the object is at a point-blank range, and a photographing mode is switched to a macro mode.

14. The camera with AF auxiliary illumination according to claim 1, wherein
if the photometric value of the AF auxiliary illumination reflected from the object exceeds a third specified value, it is judged that the object is in a short range, and an emission amount of a stroboscope is controlled to be dimmed out.

15. The camera with AF auxiliary illumination according to claim 14, wherein
if the photometric value of the AF auxiliary illumination reflected from the object is at the almost highest value, it is determined that the object is at a point-blank range, and a photographing mode is switched to a macro mode.

16. The camera with AF auxiliary illumination according to claim 1, wherein
if the photometric value of the AF auxiliary illumination reflected from the object is at the almost highest value, it is determined that the object is at a point-blank range, and a photographing mode is switched to a macro mode.

17. The camera with AF auxiliary illumination according to claim 1, wherein
the AF auxiliary illumination controlling device stops decreasing the emission amount of the AF auxiliary illumination when an AF evaluation value evaluated by the AF controlling device begins to increase.

18. A method for controlling an AF auxiliary illumination for a camera which performs AF control, the method comprising:
measuring a light from an object to obtain a photometric value of the light;
emitting an AF auxiliary illumination toward the object if the photometric value of the light from the object is less than a predetermined value;
measuring the AF auxiliary illumination reflected from the object to obtain a photometric value of the reflected AF auxiliary illumination;
gradually decreasing an emission amount of the AF auxiliary illumination if the photometric value of the reflected AF auxiliary illumination is greater than or equal to a first specified value so that the AF auxiliary illumination is dimmed out, and controlling the emission amount of the AF auxiliary illumination based on a focus position of an image taking lens; and
controlling the focus position of the image taking lens based on contrast information of an image acquired via the image taking lens while the emission amount of the AF auxiliary illumination is decreased.

* * * * *